Feb. 10, 1948. J. DE SWART 2,435,876
BLIND BOLT
Filed June 20, 1944

Inventor
Jan de Swart
By Lyon & Lyon
Attorneys

Patented Feb. 10, 1948

2,435,876

UNITED STATES PATENT OFFICE 2,435,876

BLIND BOLT

Jan de Swart, Los Angeles, Calif., assignor, by mesne assignments, to Shellmar Products Corporation, Chicago, Ill., a corporation of Delaware Application June 20, 1944, Serial No. 541,169

1 Claim. (Cl. 85—2.4)

This invention relates to a bolt, and refers particularly to a bolt which is intended to be inserted from one side of an opening as distinguished from the general practice in which the bolt may be inserted from one side of an opening and the nut attached from the opposite side.

It is the general object of the present invention to provide a bolt and nut which may be inserted into an opening from one side only and manipulated from that side to bolt two or more walls together.

Another object of the present invention is to provide a bolt and nut device with plastic means adapted to undergo expansion at the rear end of the combination in bolting operations, and providing a lock-nut action.

The novel blind bolt and nut device of the present invention, together with further objects and advantages thereof, will be more fully understood from the following description of the preferred example of the invention. The description is given in connection with the accompanying drawings, in which Fig. 1 is an elevation in section, showing the device installed in an opening in two plates to be bolted together, but before the bolting operation.

Figure 1:
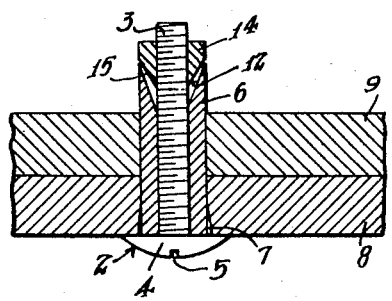

Referring to the drawings, the device of the present invention comprises a bolt 2 which may be of any usual or preferred construction and is indicated as having a threaded shank 3 and head 4 with kerfs 5 for the reception of a screw driver or other turning device. The bolt may be constructed of any preferred form of metal, in accordance with the usual practice. Inclosing the bolt 2 is the plastic sleeve 6. The outer surface of the sleeve 6 is generally cylindrical, but at the lower end of the sleeve, as viewed in the drawings, or the end that engages the head 4 of the metal bolt member, the sleeve 6 is provided with a number of projecting ribs 7, the purpose of which is to cut into the wall, or wedge into the walls, of the bore through which the device is to be installed.

Figure 2:
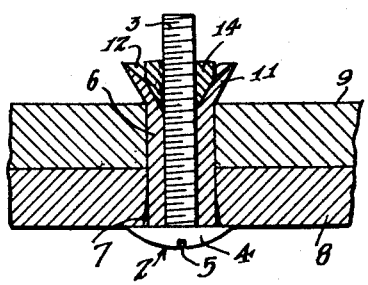
Fig. 2 is a similar view, showing the final position of the bolt.
Figure 5:
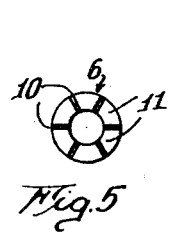
Fig. 5 is a top view of the sleeve shown in Fig. 4.
Figure 4:
Fig. 4 is an elevation of the plastic sleeve of the unit before the expanding or bolting operation.
Figure 6:
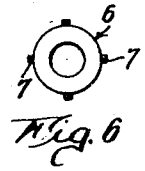
Fig. 6 is a bottom view.
Figure 3:
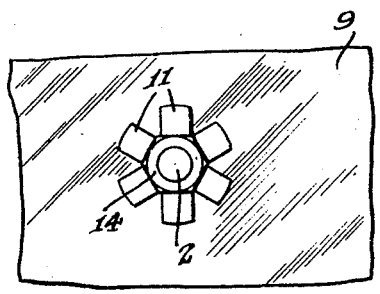
Fig. 3 is a top view of the bolt and nut combination.

Thus, as indicated in Figs. 1 and 2, I have shown the device as being installed in an opening in two plates 8 and 9 which are to be bolted together by the device of the present invention. The ribs 7 on the sleeve are in position to bite into the plate 8 and thereby lock the sleeve 6 against rotation relative to the plate.

The upper end of the sleeve, as shown in the drawing, is provided with a plurality of slots 10 dividing the upper portion of the sleeve into a plurality of fingers or tongues 11, which are intended to be bent outwardly in bolting operations, as hereafter described. The upper end of the sleeve 6 is also provided with an expanding or tapered bore 12.

To the free end of the bolt 2 there is threaded a nut 14, the lower face of which, as viewed in Figure 1, is tapered as indicated at 15 substantially in accordance with the taper 12 on the sleeve 6. The maximum diameter of the nut 14 is made substantially the same as the normal diameter of the unexpanded sleeve 6 so that the nut 14 is equally expandable for passing through the plates 8 and 9 as between the sleeve 6.

In using the device of the present invention, it will be readily seen that any opening of the plates 8 and 9 which passes the sleeve 6, will also pass the nut 14 so that the bolt and nut combination can be utilized as a blind device to be inserted from one side only. On insertion of the device the ribs 7 on the sleeve bite into the walls of the plate 8 sufficient to lock the sleeve from rotation. When the metal bolt 2 is turned in the proper direction, the frictional engagement between tapered surfaces 12 and 15 lock the nut 14 from rotating with the result that it is wedged longitudinally toward the head 2, expanding the fingers 11 of the plastic sleeve 6, when the bolt nut finally arrives in the position shown in Fig. 2, in which the outwardly expanding fingers 11 of the sleeve 6, under pressure of the nut 14, adequately locks plates 8 and 9 together.

Figure 7:
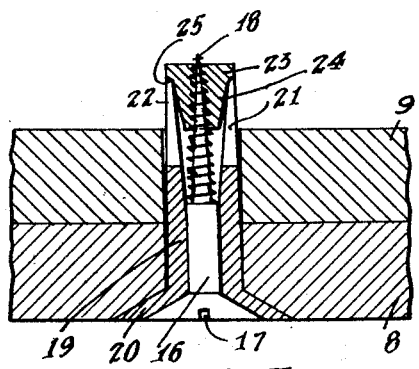
Fig. 7 is an elevation in section of a modified form of the device.

Now referring to Fig. 7 of the drawings, I have shown a form of the invention in which, in place of the bolt 2 of Figs. 1 to 6 inclusive, the device includes a wood screw 16 of any usual or preferred form. The wood screw 16 is shown as having a kerf 17 for the reception of a screwdriver and having a pointed screw end portion 18. The wood screw 16 extends through the bore of a plastic sleeve 19 which has a head 20 indicated as having a countersunk portion for receiving the head of the wood screw 16. The plastic sleeve 19 is in a manner similar to that of sleeve 6 provided with a plurality of slots 21 dividing the upper portion of the sleeve 19 into a plurality of fingers or tongues 22 which are intended to be bent outwardly in the bolting operations as hereafter described. The upper end of the sleeve 19 is also provided with an expanding or tapering bore so that the thickness of the fingers decrease towards their ends.

The pointed screw 18 is inserted into a nut 23 which may be formed of plastic material. This nut 23 is provided with tapering surfaces 24 and with shoulders 25 against which the ends of the fingers 22 bear in the initial position of the device.

In the use of the form of the invention shown in Fig. 7, it will be apparent that the device may be inserted through the openings of the plates 8 and 9 so that the device may be operated totally from one side of the plates. After insertion of the device the wood screw is turned by a screw driver engaging the kerf 17 so as to cause the bolt 23 to wedge out the fingers 22 in the manner similar to that illustrated in connection with Fig. 2.

Figure 8:
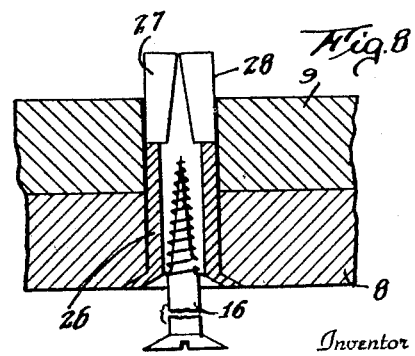
Fig. 8 is an elevation in section of a further modified form of the device.

Now referring to Fig. 8 of the drawings, I have shown a somewhat modified form of the invention in which the wood screw 16 may be the same as that shown in Fig. 7 and therefore similarly numbered. A plastic sleeve 26 is employed and in this plastic sleeve the functions performed by the nut 23 and the fingers 22 of the form shown in Fig. 7 are combined in the plastic sleeve. For this purpose the upper end of the plastic sleeve is slotted, as indicated at 27, to form fingers 28, the inner surfaces of which contract towards the upper end of the plastic sleeve 26 and therefore are adapted to be wedged outwardly on the insertion of the pointed end of the wood screw 16.

While the particular form of the device herein described is well adapted to carry out the objects of the present invention, various modifications and changes may be made, and this invention is of the scope set forth in the appended claim.

I claim:

A blind fastening device comprising a sleeve of deformable plastic material, a metal screw having a self-tapping tapered threaded end portion adapted to be inserted through said sleeve, said sleeve having a slotted inner end extension provided with an outwardly tapering internal bore and a deformable plastic nut having an inwardly tapered portion extending into the tapered internal bore of said end extension, said nut means adapted to receive the threaded end portion of said metal screw and to be deformed by rotation of said metal screw to axially compress and radially expand said sleeve.

JAN DE SWART.

REFERENCES CITED

The following references are of record in the file of this patent:

UNITED STATES PATENTS

| Number | Name | Date |
|---|---|---|
| 228,816 | Huff | June 15, 1880 |
| 462,601 | Thinnes | June 25, 1929 |
| 976,096 | Pansch | Nov. 15, 1910 |
| 1,122,280 | Kempshall | Dec. 29, 1914 |
| 1,158,633 | Carpenter | Nov. 2, 1915 |
| 1,469,667 | Pleister | Oct. 2, 1923 |
| 1,640,433 | Weldon | Aug. 30, 1927 |
| 1,718,438 | Ross | June 25, 1929 |
| 1,738,609 | Pivouski | Dec. 10, 1929 |
| 1,814,965 | Rosenberg | July 14, 1931 |
| 1,927,271 | Noelting | Sept. 19, 1933 |
| 1,935,336 | Sluyter | Nov. 14, 1933 |
| 2,150,080 | Rawlings | Mar. 7, 1939 |
| 2,296,470 | Keehn | Sept. 22, 1942 |
| 2,333,277 | Swank | Nov. 2, 1943 |
| 2,319,376 | Wallace | May 18, 1943 |
| 2,365,372 | Allen | Dec. 19, 1944 |